United States Patent [19]
Bieck et al.

[11] Patent Number: 5,381,897
[45] Date of Patent: Jan. 17, 1995

[54] DEVICE FOR STORING MAGNETIC TAPE CASSETTES

[75] Inventors: Torsten Bieck, Dornstetten/Hallwangen; Wolfgang Nehl, Tumlingen/Waldachtal, both of Germany

[73] Assignee: fischerwerke, Artur Fischer GmbH & Co. KG, Waldachtal/Tumlingen, Germany

[21] Appl. No.: 75,955

[22] Filed: Jun. 11, 1993

[30] Foreign Application Priority Data

Jun. 12, 1992 [DE] Germany ............................ 4219233

[51] Int. Cl.⁶ ............................................ B65D 85/672
[52] U.S. Cl. .................................. 206/387.1; 220/348
[58] Field of Search ........................ 312/9.11, 9.9, 9.16, 312/9.17, 9.26, 9.29, 9.32, 9.41, 9.57; 206/387; 220/345, 346, 347, 348

[56] References Cited

U.S. PATENT DOCUMENTS

| | | |
|---|---|---|
| 3,899,229 | 12/1975 | Ackeret . |
| 4,030,601 | 6/1977 | Ackeret ................... 206/387 |
| 4,087,145 | 5/1978 | Weavers .................. 206/387 X |
| 4,113,091 | 9/1978 | Ackeret ................... 206/387 |
| 4,196,806 | 4/1980 | Posso . |
| 4,322,000 | 3/1982 | Struble ................... 206/387 |
| 4,875,584 | 10/1989 | Ackeret . |
| 5,215,212 | 6/1993 | Stephan ................... 206/387 X |

FOREIGN PATENT DOCUMENTS

| | | |
|---|---|---|
| 2427105 | 12/1975 | Germany . |
| 2427109 | 1/1976 | Germany . |
| 3816384 | 11/1989 | Germany . |
| 3904787 | 8/1990 | Germany . |
| 4020163 | 1/1992 | Germany . |
| 4039954 | 6/1992 | Germany . |
| 2100706 | 1/1983 | United Kingdom . |
| 704478 | 12/1979 | U.S.S.R. . |

*Primary Examiner*—Jacob K. Ackun, Jr.
*Attorney, Agent, or Firm*—Michael J. Striker

[57] ABSTRACT

A device for storing magnetic tape cassettes has a housing, a slider movable into the housing to a storage position and provided with locking members engageable with tape reel hubs of a compact cassette stored in the device, and a spring wire acting on the pivotally mounted locking members and holding them below a supporting surface of the slider member when the latter is located outside of the housing, and when the slider member is moved into the housing a control edge of the housing presses the spring wire to transfer torque to the locking members so as to displace them away from the supporting surface and pivot them into the tape reel hubs of the compact cassette.

6 Claims, 4 Drawing Sheets

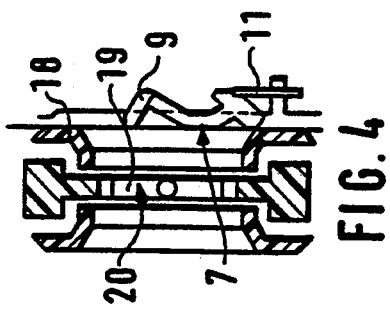
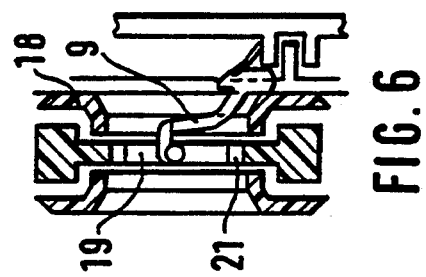
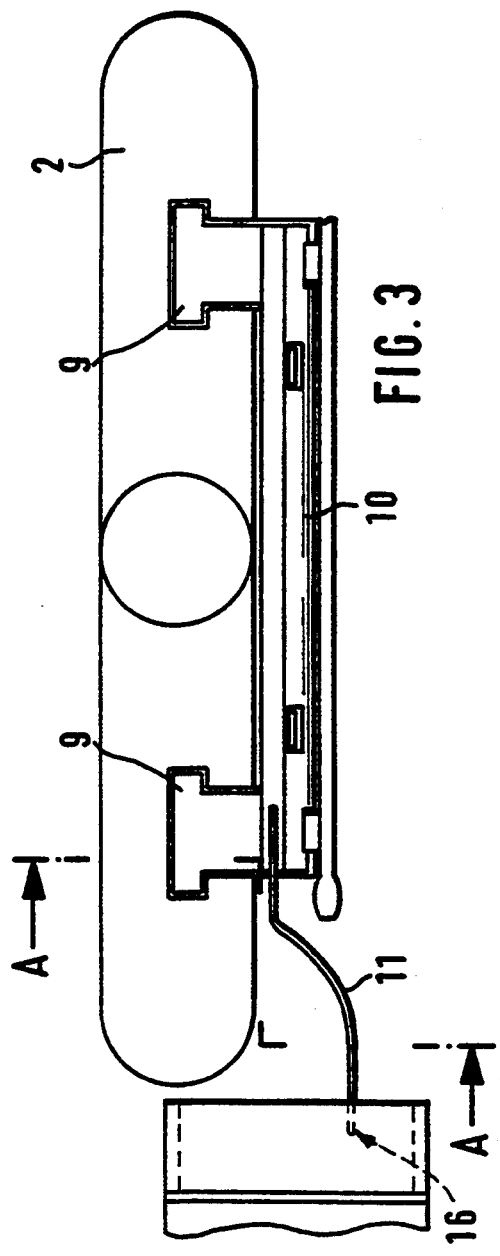
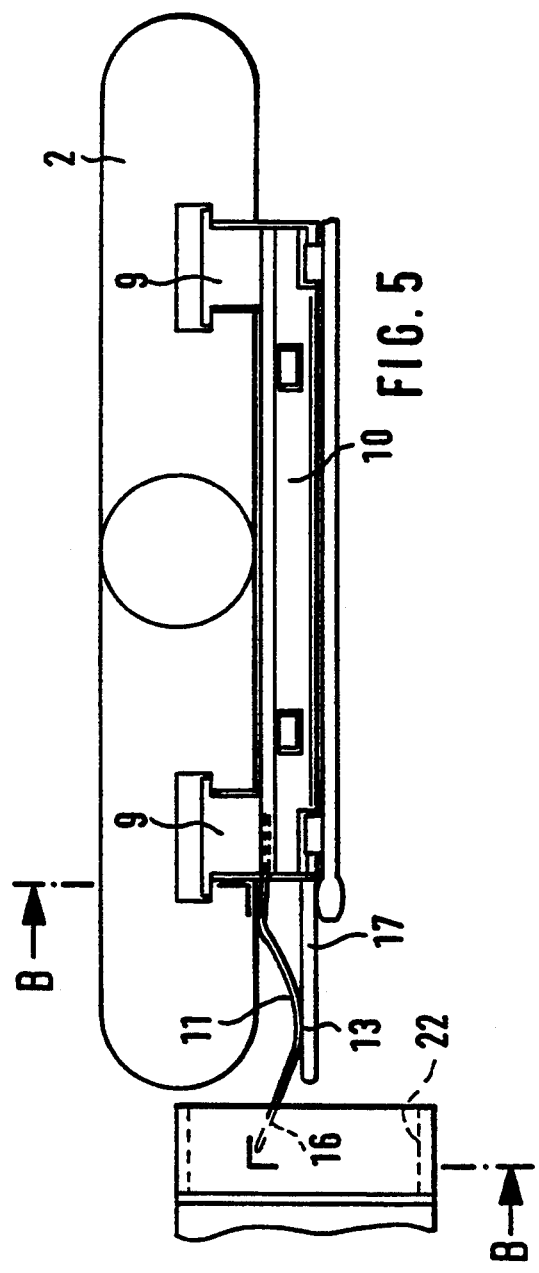

DEVICE FOR STORING MAGNETIC TAPE CASSETTES

BACKGROUND OF THE INVENTION

The present invention relates to devices for storing magnetic tape cassettes.

More particularly, it relates to a device for storing magnetic tape cassettes, which has a housing and a slider insertable into the housing against a spring force and having locking members engaging tape reel hubs of a cassette stored in the device.

Devices of the above mentioned general type are also called storage containers and well known in the art. One of such devices is disclosed, for example, in U.S. Pat. No. 3, 899,229. In this device the slider inserted in the housing is locked in the inserted position. It holds a cassette to be stored, which can be easily removed or exchanged in the removal position of the slider. In the removal position the slider siginificantly protrudes from the housing, while in the storage position the slider can be locked in the housing and can be unlocked by operating a button.

The storage containers of this type have been used for a long time for storing commercially available compact cassettes with freely accessible tape reel hubs. For preventing uncontrolled movements of the reel hubs and consequently also of the wound-up tape material when subjected to vibrations, storage containers with locking members have been developed. In a known device of this type rigid locking projections project from the slider and engage in the reel hubs of the compact cassette when it is located on the slider to secure them against rotation. However, closed magnetic tape cassettes cannot be placed on the slider having the rigidly mounted locking projections. For this reason the device is not suitable for storing digital cassettes which have completely closed wide faces.

The digital cassettes can be played back in playback apparatuses which are compatible with compact cassettes. The dimensions of the digital cassettes substantially correspond to the dimensions of the compact cassettes, so that storage of both cassettes in one storage system can be advantageous.

SUMMARY OF THE INVENTION

Accordingly, it is an object of the present invention to provide a device for storing magnetic tape cassettes, which avoids the disadvantages of the prior art.

More particularly, it is an object of the present invention to provide a device for storing compact cassettes and digital cassettes, which has locking members for engagement with the tape reel hubs of the compact cassettes.

In keeping with these objects and with others which will become apparent hereinafter, one feature of the present invention resides, briefly stated, in a device for storing magnetic tape cassettes, which has a housing and a slider member insertable in the housing to a storage position against a spring force and provided with locking members which engage the two tape reel hubs of a compact cassette stored in the device and lying on a supporting surface of the slide member, wherein in accordance with the invention a spring wire acts on the pivotally mounted locking members and hold them below the supporting surface when the slider member is located outside the housing in the removal position, and when the slider member is located in the housing in the storage position a control edge projecting from a base inside the housing presses against the spring wire so that this transfers a torque to the locking members which presses them upwards away from the supporting surface and, with the compact cassette inserted, pivots them into the tape reel hubs thereof.

In the device designed in accordance with the present invention, when the slider member is ejected, the spring element formed by the spring wire pivots the pivotally mounted locking members below the supporting surface of the slider member. With the slider member inserted, a projecting control edge inside the housing presses against the spring wire, and the spring wire in turn presses the locking members resiliently upwards out of the supporting surface into their locking position. When a compact cassette with open tape reel hubs is located on the slider member, the locking members can engage the free space of the tape reel hubs without obstruction and lock them so that they cannot rotate. When however a digital cassette with covered tape reel hubs is located on the slider member, the locking members come to rest against the housing of the digital cassette as soon as the control edge presses against the spring wire when the slider member is inserted. Since the spring wire is resilient, the slider member can nevertheless be pushed without difficulty completely into the housing to the storage position in which it is locked in a known manner.

In accordance with another feature of the present invention the locking members can project laterally from a common shaft formed as a plastic bar which can also be identified as a locking plate. The shaft is mounted below the supporting surface of the slider member. In the open condition when the slider member is in the removal position, no part of the locking members and the elements required for their actuation project above the supporting surface of the slider member. Therefore it is not necessary for each particular cassette to be inserted to be placed exactly from above on the supporting surface. Depending on the construction of the slider member, in its removal position a magnetic tape cassette can be placed on the supporting surface or removed from it by a lateral displacement.

In accordance with still another feature of the present invention, the spring wire is bent in the shape of a segment of a circle and actuates the locking members. It acts on the shaft eccentrically relative to its pivot axis and holds down the locking members without the control edge becoming effective. When the slider member is inserted the curved part of the spring wire takes up a position against the control edge and transfers an oppositely directed torque to the shaft so that the locking members are pressed resiliently into the locking position. This construction for resilient actuation of the locking members is very simple and can be also used with the slider member arranged longitudinally or transversely.

The novel features of the present invention are set forth in particular in the appended claims. The invention itself, however, both as to its construction and its manner of operation will be best understood from the following description of preferred embodiments, which is accompanied by the following drawings.

BRIEF DESCRIPTION OF THE DRAWINGS

FIG. 3 is an enlarged view of an underside of the slider member of FIG. 1 in the region of the locking members;

FIG. 4 is a view showing a section AA of FIG. 3 with a compact cassette which lies on the slider member;

FIG. 5 is a view showing a region of the underside of the slider member shown in FIG. 3, but with the slider member pushed into the housing;

FIG. 6 is a view showing a section BB of FIG. 5 with a compact cassette which lies on the slider member;

DESCRIPTION OF PREFERRED EMBODIMENTS

Figure 1:
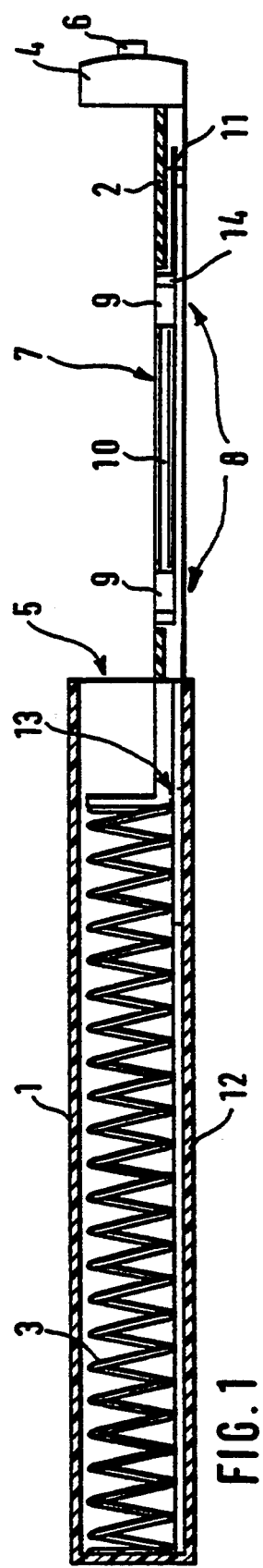
FIG. 1 is a view showing a longitudinal section of a device in accordance with the present invention, with a longitudinally oriented slider member in a removal position.

A device for storing magnetic tape cassettes is shown in FIG. 1 and has a housing 1 and a longitudinally extending slider member 2 in a removal position. The slider member 2 is movable into the housing 1 to a storage position against the force of a compression spring 3 arranged in the housing 1. In the storage position a panel 4 mounted at the front of the slider member closes an open side 5 of the housing 1 and is locked with the housing 1 by a not shown latching mechanism. A release button 6 performs unlocking, and as a result the compression spring 3 moves the slider member 2 again into the removal position, as shown in the drawing. The latching mechanism is not described in detail since it is well known per se and is not a subject of the present invention.

A digital cassette or a compact cassette can be placed on the supporting surface 7 of the slider member 2 in the shown position. A locking device 8 provided on the slider member 2 is inactive in the removal position. Locking members 9 of the locking device 8 are connected by a common shaft 10 and mounted pivotally. They do not project above the supporting surface 7 of the slider member. A spring wire 11 acts eccentrically on the shaft 10 so as to retain the locking members 9 in the shown position.

A control edge 13 projects upwards from a base 12 of the housing and is located inside the latter. When the slider member 2 is inserted into the housing 1, the control edge comes to rest against the spring wire 11.

Figure 2:
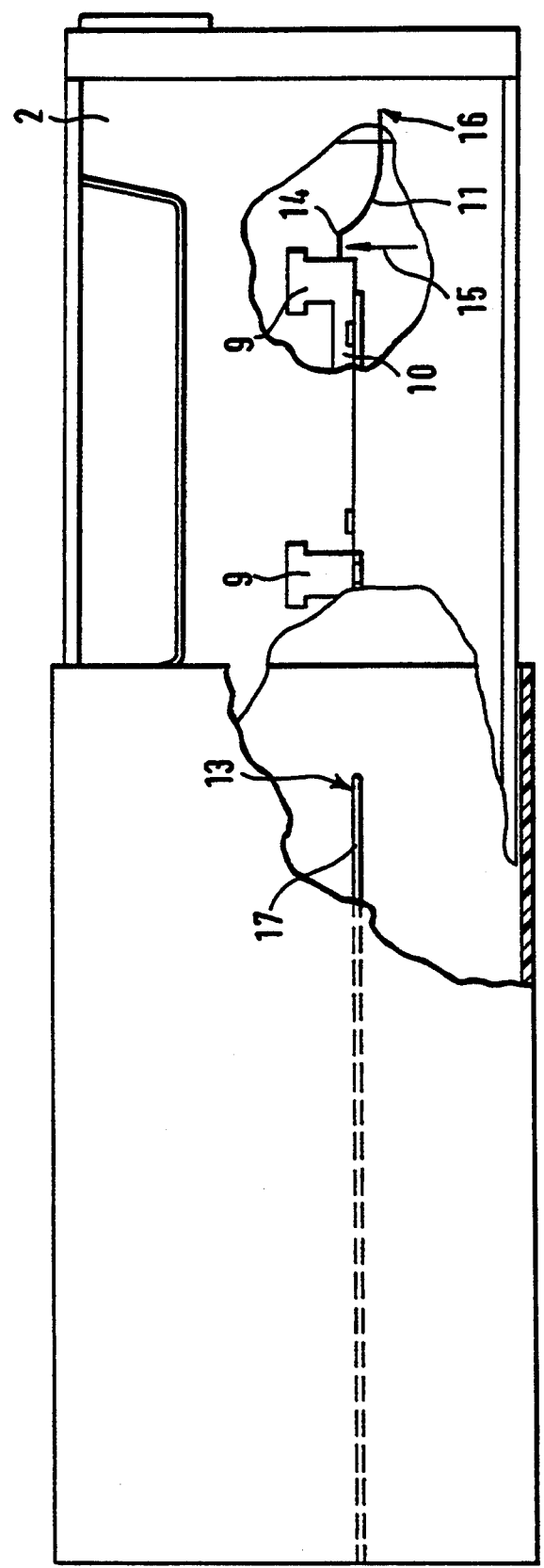
FIG. 2 is a plan view of the inventive device shown in FIG. 1.

A part of the spring wire 11 is bent in the shape of a segment of a circle, as can be seen from FIG. 2. When the slider member 2 is inserted, the control edge comes in contact with the spring wire 11 in its curved region so that the end 14 of the spring wire acting eccentrically on the shaft 10 is pushed away laterally in direction of the arrow 15. When in this case a compact cassette with freely accessible tape reel hubs is located on the slider member 2, the locking members 9 are pivoted into the free space of the tape reel hubs. When however a closed digital cassette is located on the slider member, then the locking members 9 are pressed resiliently against the outside of the digital cassette.

The spring wire 11 is mounted so that its end 16 is laterally displaceable on the underside of the slider member 2. It is also possible to provide a rigid mounting. The control edge 13 is a part of a guide rail 17 which guides the slider member 2 along a straight line.

Figure 10:
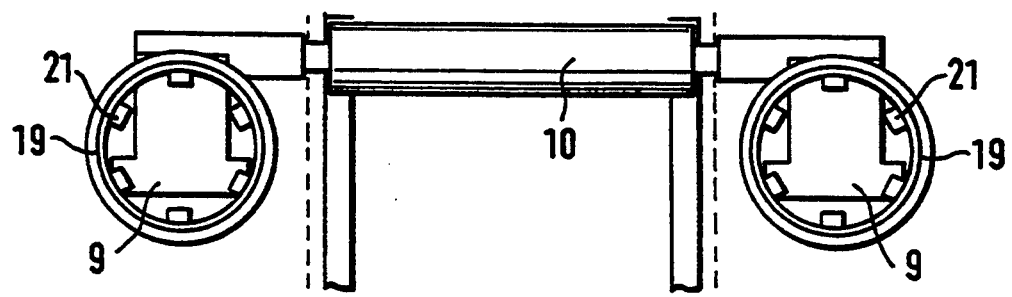
FIG. 10 is a plan view in the region of the tape reel hubs with a compact cassette which lies on the slider member.

The underside of the slider member 2 in the region of the locking means 8 is shown in FIG. 3 on an enlarged scale. The slider member 2 is here in the removal position shown in FIGS. 1 and 2. The cross section of FIG. 4 shows an inserted compact cassette 18 in the region of the tape reel hub 19. The locking member 9 is formed as a plastic bar and still located below the supporting surface 7 and therefore it does not engage yet the free space 20 of the tape reel hub 19. FIG. 10 shows a plan view of the region of the tape reel hub 19 of a compact cassette, and the locking members 9 as in FIGS. 3 and 4 not yet engage between the drive members 21 of the tape reel hubs.

In FIG. 5 the slider member 2 is in the storage position, or in other words it is pushed completely into the housing 1. In this position the lateral control edge 13 of the guide strip 17 presses the spring wire 11 to the side, and therefore its end 16 which is guided in the guide channel 22 is correspondingly laterally deflected with respect to the position shown in FIG. 3. This lateral deflection causes the spring wire 11 which is eccentrically mounted on the shaft 10, to transfer a torque to the shaft 10 and correspondingly pivot the locking members 9 upwards out of the supporting surface 7 of the slider member. FIG. 6 shows the pivoted-out locking member 9 which engages between the driver members 21 of the tape reel hub 19.

Figure 8:
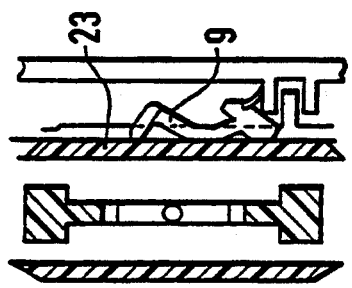
FIG. 8 is a view showing a section CC of FIG. 7.
Figure 7:
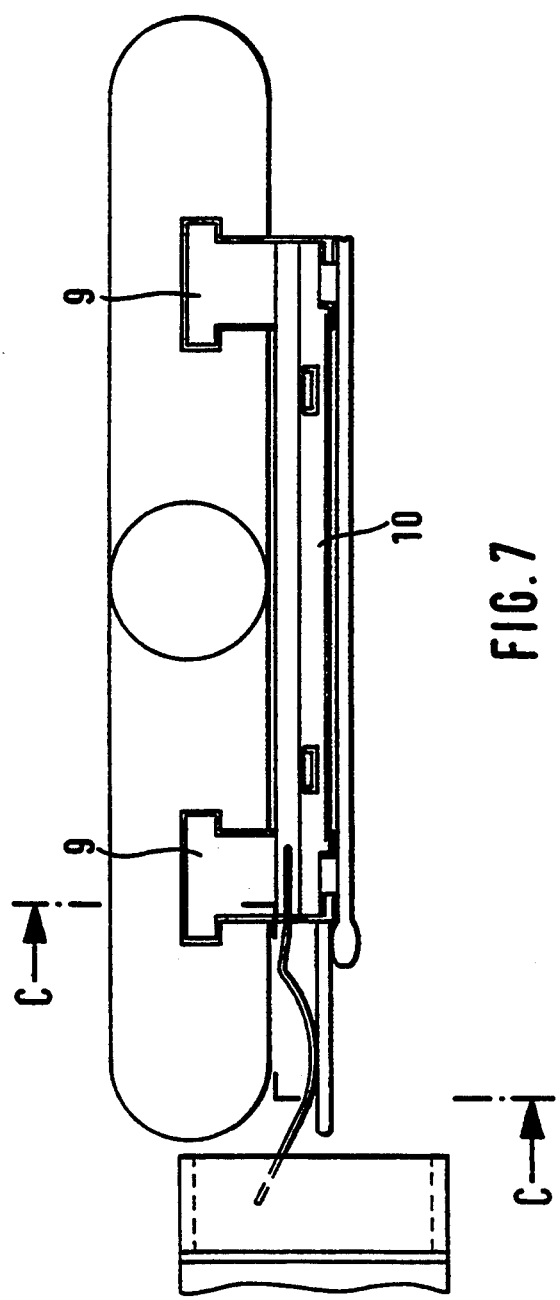
FIG. 7 is a view showing an underside of the slider member in the region of the locking members with the slider member pushed in as shown in FIG. 5, but with a digital cassette with covered tape reel hubs located on the slider member.

In FIG. 7 the slider member 2 is also in the storage position. In other words, it is located completely inside the housing 1, but a digital cassette 23 (FIG. 8) closed on its flat faces is located on the slider member 2. The spring wire 11 does not exert a torque on the shaft 10 as in FIG. 5, but the shaft is turned away until the locking members 9 rest against the digital cassette 23. FIG. 8 shows this position in cross-section.

Figure 9:
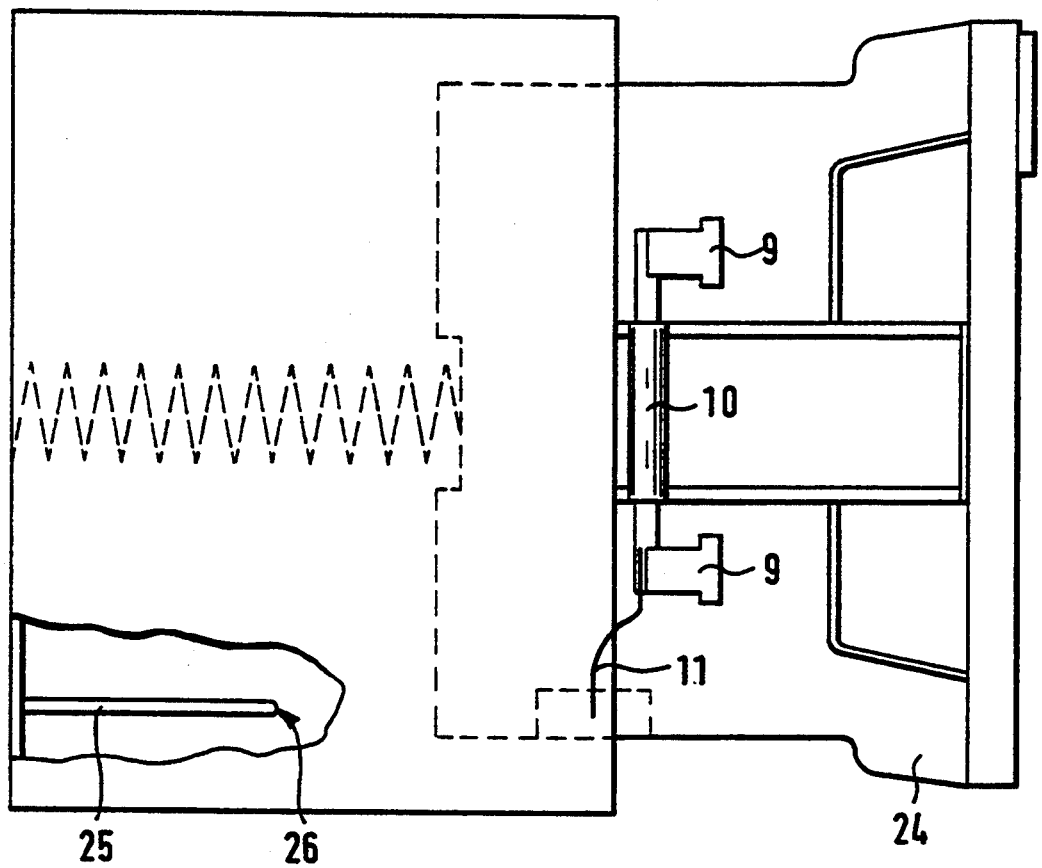
FIG. 9 is a plan view of a device in which the magnetic tape cassette to be inserted is placed transversely on the slider member.

FIG. 9 shows a plan view of the inventive device with a transversely arranged slider member 24. A guide rail 25 with a front control edge 26 comes into contact with the curved spring wire 11 when the slider member 24 is inserted, and deflects it in the same way as in the previous embodiments.

It will be understood that each of the elements described above or two or more together, may also find a useful application in other types of constructions differing from the types described above.

While the inventive device has been illustrated and described as embodies in a device for storing magnetic taoe cassettes, it is not limited to the details shown since various modifications and structural changes are possible without departing in any way from the spirit of the present invention.

Without further analysis the foregoing will so fully reveal the gist of the present invention that others by applying common knowledge can readily adapt it for various applications without omitting features which from the standpoint of the prior art fairly constitute essential characteristics of the generic or specific aspects of this invention.

What is claimed as new and desired to be protected by Letters Patent is set forth in the appended claims.

We claim:

1. A device for storing magnetic tape cassettes, comprising a housing provided with a control edge; a slider member insertable into said housing to a storage position; provided with locking members for engaging with tape reel hubs of a compact cassette when the compact cassette is stored in the device and lies on a supporting surface of said slider member; a common shaft connecting said locking members with one another and turnably supported with said locking members in said slider; a pressure spring arranged to move said slider outwardly of said housing to a removal position; and a spring wire acting on said locking members and holding the latter below said supporting surface when said slider member is located outside said housing in a removal position, while when said slider member is located in said housing in the storage position said control edge presses against said spring wire to apply a torque to said locking members and to thereby press said locking members upwards away from said supporting surface and, when a compact cassette is inserted, to move said locking members for inserting into the tape reel hubs of the cassette, said locking members being mounted pivotally on said slider member for pivoting said locking members into the tape reel hubs when the compact cassette is inserted, said spring wire having one end which is bent in the shape of a segment of a circle and acts on said locking members with respect to a pivot axis of said locking members, said one end of said spring wire acting directly on said common shaft on which said locking members are mounted, so as to thereby act on said locking members, said spring wire having another end which is fixed to a base of said slider member and is mounted on said slider member so as to be laterally displaceable.

2. A device as defined in claim 1, wherein said locking members project laterally from said common shaft, said common shaft being below said supporting surface of said slider member.

3. A device as defined in claim 2, wherein said common shaft is formed as a flat plastic bar.

4. A device as defined in claim 2, wherein said one end of said spring wire is connected with said shaft, said control edge acting on said spring wire at a distance from said end of said spring wire.

5. A device as defined in claim 1, wherein said slider member has a predetermined direction of movement and extends longitudinally with respect to said direction of movement.

6. A device as defined in claim 1, wherein said slider member has a predetermined direction of movement and extends transversely with respect to said direction of movement.

* * * * *